(12) United States Patent
Bok et al.

(10) Patent No.: US 10,795,417 B2
(45) Date of Patent: Oct. 6, 2020

(54) DISPLAY DEVICE HAVING A PLANAR SURFACE PORTION AND A CURVED SURFACE PORTION

(71) Applicant: Samsung Display Co., Ltd., Yongin-si (KR)

(72) Inventors: Seunglyong Bok, Hwaseong-si (KR); Heejune Kwak, Yongin-si (KR); Mugyeom Kim, Hwaseong-si (KR); Youngseok Kim, Seoul (KR); Hojung Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/806,261

(22) Filed: Nov. 7, 2017

(65) Prior Publication Data

US 2018/0143669 A1    May 24, 2018

(30) Foreign Application Priority Data

Nov. 22, 2016 (KR) .......... 10-2016-0155739

(51) Int. Cl.
*G06F 1/16* (2006.01)
*G06F 3/041* (2006.01)
*G06F 3/042* (2006.01)
*G06F 3/044* (2006.01)
(Continued)

(52) U.S. Cl.
CPC .......... *G06F 1/1692* (2013.01); *G06F 1/1626* (2013.01); *G06F 1/1637* (2013.01); *G06F 1/1643* (2013.01); *G06F 3/044* (2013.01); *G06F 3/0412* (2013.01); *G06F 3/0414* (2013.01); *G06F 3/0416* (2013.01); *G06F 3/042* (2013.01); *G06F 3/043* (2013.01); *G06F 3/045* (2013.01);
(Continued)

(58) Field of Classification Search
CPC .... G06F 1/1692; G06F 1/1643; G06F 3/0412; G06F 3/0414; G06F 3/0416; G06F 3/044; G06F 3/042; G06F 3/043; G06F 3/045; G06F 2203/04102; G06F 2203/04105; G06F 2203/04106
See application file for complete search history.

(56) References Cited

U.S. PATENT DOCUMENTS

| 5,008,497 A * | 4/1991 | Asher .................. G06F 3/0414 178/18.05 |
| 7,489,066 B2 | 2/2009 | Scott et al. |
| 8,723,813 B2 | 5/2014 | Park et al. |

(Continued)

FOREIGN PATENT DOCUMENTS

| KR | 10-2014-0073216 | 6/2014 |
| KR | 10-2015-0094989 | 8/2015 |

(Continued)

*Primary Examiner* — Stephen G Sherman
(74) *Attorney, Agent, or Firm* — H.C. Park & Associates, PLC

(57) ABSTRACT

A bent display device including: a display panel including a planar surface portion and a curved surface portion at an edge of the planar surface portion; a window having substantially the same shape as a shape of the display panel and disposed on the display panel; a first touch sensor overlapping the planar surface portion; and a second touch sensor overlapping the curved surface portion. The first touch sensor and the second touch sensor detect a touch using different methods, respectively.

13 Claims, 14 Drawing Sheets

(51) Int. Cl.
 *G06F 3/043* (2006.01)
 *G06F 3/045* (2006.01)
(52) U.S. Cl.
 CPC .............. *G06F 2203/04102* (2013.01); *G06F 2203/04105* (2013.01); *G06F 2203/04106* (2013.01)

(56) References Cited

U.S. PATENT DOCUMENTS

| | | | |
|---|---|---|---|
| 8,781,180 B2 | 7/2014 | Schneider et al. | |
| 9,435,939 B2* | 9/2016 | Yang | G02B 6/0078 |
| 2002/0196238 A1* | 12/2002 | Tsukada | G06F 3/0421 |
| | | | 345/173 |
| 2004/0119676 A1* | 6/2004 | Nam | G09G 3/3648 |
| | | | 345/87 |
| 2004/0206190 A1* | 10/2004 | Kawahata | A61B 5/1172 |
| | | | 73/862 |
| 2006/0190836 A1* | 8/2006 | Ling Su | G06F 1/1616 |
| | | | 715/773 |
| 2013/0321296 A1 | 12/2013 | Lee et al. | |
| 2014/0253477 A1* | 9/2014 | Shim | G06F 3/0487 |
| | | | 345/173 |
| 2015/0036065 A1 | 2/2015 | Yousefpor et al. | |
| 2015/0227172 A1 | 8/2015 | Namkung et al. | |
| 2015/0310251 A1 | 10/2015 | Wyrwas et al. | |
| 2015/0324056 A1* | 11/2015 | Sato | G06F 3/0416 |
| | | | 345/174 |
| 2015/0331508 A1 | 11/2015 | Nho et al. | |
| 2016/0004899 A1 | 1/2016 | Pi et al. | |
| 2016/0062515 A1 | 3/2016 | Bae et al. | |
| 2016/0101610 A1 | 4/2016 | Namkung et al. | |
| 2016/0147375 A1* | 5/2016 | Bok | G06F 3/0421 |
| | | | 345/175 |
| 2017/0097545 A1 | 4/2017 | Yim et al. | |
| 2017/0357440 A1* | 12/2017 | Tse | G06F 3/016 |

FOREIGN PATENT DOCUMENTS

| | | |
|---|---|---|
| KR | 10-2016-0028338 | 3/2016 |
| KR | 10-2016-0044162 | 4/2016 |

\* cited by examiner

DISPLAY DEVICE HAVING A PLANAR SURFACE PORTION AND A CURVED SURFACE PORTION

CROSS-REFERENCE TO RELATED APPLICATION

This application claims priority from and the benefit of Korean Patent Application No. 10-2016-0155739, filed on Nov. 22, 2016, which is hereby incorporated by reference for all purposes as if fully set forth herein.

BACKGROUND

Field

Exemplary embodiments relate to a bent display device. More particularly, exemplary embodiments relate to a bent display device including a planar surface portion and a curved surface portion at an edge of the planar surface portion.

Discussion of the Background

In recent times, flexible display panels that can be bent are being developed. Such a flexible display panel can be used in various fields since it can be used in a folded or curved form.

Examples of display elements applicable to such flexible display panels may include organic light emitting diode (OLED) display elements, liquid crystal display (LCD) elements, and electrophoretic display (EPD) elements. Among these, OLEDs can be manufactured into a thin film-like laminated structure, and thus, have excellent flexibility and are attracting attention as a display element for flexible display panels.

In addition, research and development of bent display devices, for example, applying a flexible display panel to a portable terminal or the like, have been recently been carried out. The flexible display device refers to a display device capable of being bent and spread out, and the bent display device refers to a display device which maintains a bent shape.

Such a bent display device enables an edge portion of the flexible display panel to be bent so that an image can be displayed on a side portion of the flexible display panel and disposes a touch sensor or the like on an edge portion of the flexible display panel so that a touch action may be performed at the side portion thereof.

However, since the touch sensor or the like is also provided at the side portion of the bent display device, the bent display device may erroneously detect an unintended touch based on the user's grip state.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a bent display device capable of substantially preventing touch malfunctions occurring at a side portion of the banded display device.

Additional aspects will be set forth in the detailed description which follows, and, in part, will be apparent from the disclosure, or may be learned by practice of the inventive concept.

According to exemplary embodiments, a bent display device includes: a display panel including a planar surface portion and a curved surface portion disposed at an edge of the planar surface portion; a window having a substantially same shape as a shape of the display panel and disposed on the display panel; a first touch sensor disposed to overlap the planar surface portion; and a second touch sensor disposed to overlap the curved surface portion. The first touch sensor and the second touch sensor detect a touch using different methods, respectively.

The first touch sensor may be a capacitive touch sensor.

The second touch sensor may include at least one of: a pressure sensitive touch sensor, an optical touch sensor and an ultrasonic touch sensor.

The first touch sensor may have a substantially same shape as a shape of the planar surface portion on a plane.

The second touch sensor may have a substantially same shape as a shape of the curved surface portion on a plane.

The first touch sensor and the second touch sensor may include different driving units, respectively.

The display panel may be an organic light emitting diode display panel.

The first touch sensor may be disposed between the display panel and the window.

The first touch sensor may be formed inside the display panel.

The second touch sensor may be disposed between the display panel and the window.

The second touch sensor may be disposed on a rear surface of the display panel.

The second touch sensor may include: a first electrode and a second electrode disposed to oppose each other; and a filler between the first electrode and the second electrode.

The filler may include at least one of silicon and polydimethylsiloxane (PDMS).

The second touch sensor may include a control unit applying a voltage to the first electrode and the second electrode and sensing a capacitance between the first electrode and the second electrode.

The second touch sensor may include: a sensor resistor having a resistance value that varies in accordance with a pressure applied by a contact; a filter resistor connected in series to the sensor resistor and having a constant resistance value; and a pressure sensing unit connected to a node between the sensor resistor and the filter resistor.

The curved surface portion may include: a pixel area at which an image is displayed; and a transmissive area, between the pixel areas, through which a light is transmitted.

The transmissive area may gradually increase from a boundary between the planar surface portion and the curved surface portion toward an edge of the display panel.

The display panel may include: a first pixel disposed at the planar surface portion and displaying an image; and a second pixel disposed at the curved surface portion and displaying an image. The first pixel may have a larger area than an area of the second pixel.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
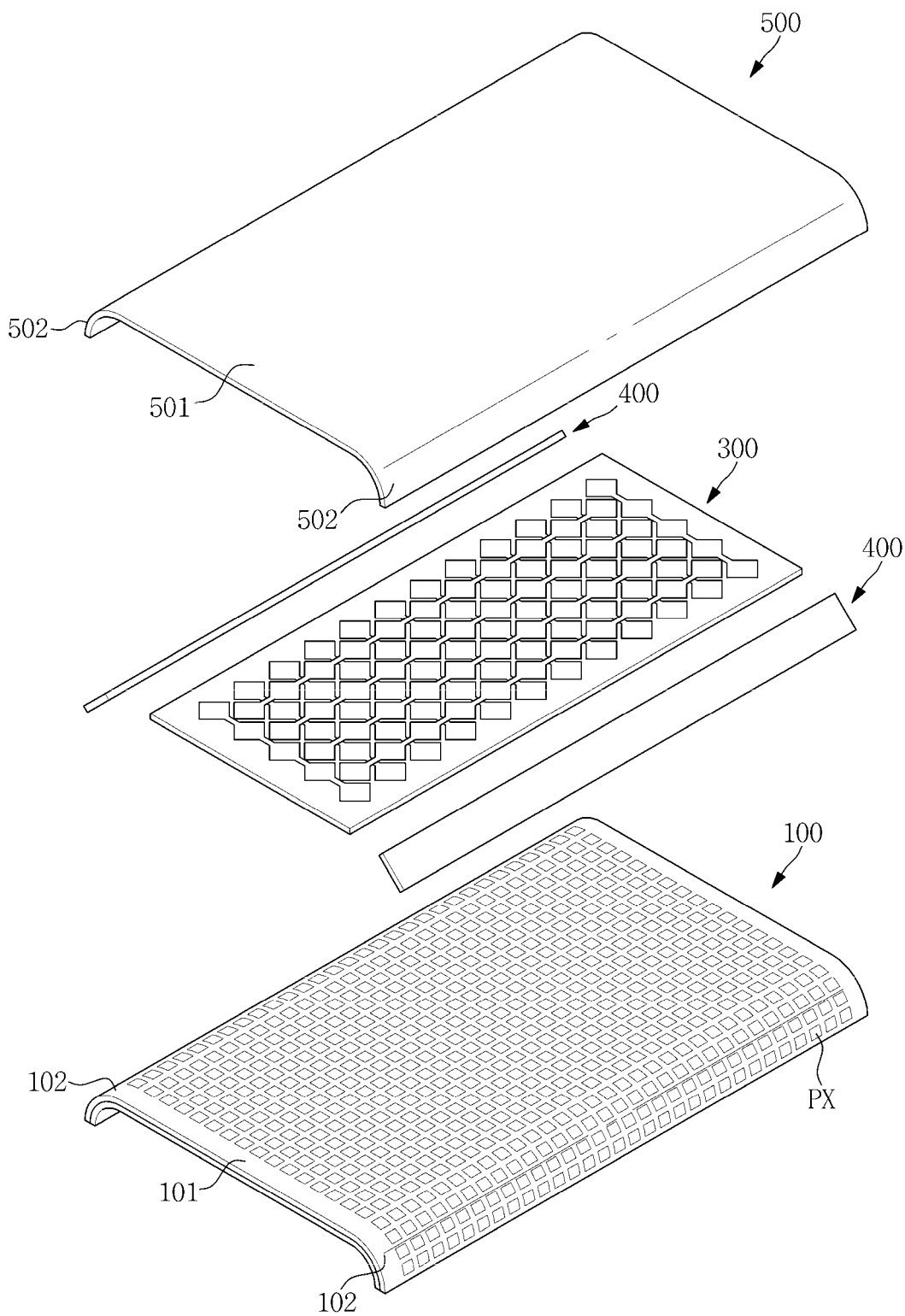
FIG. 1 is an exploded perspective view illustrating a bent display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on,"ed to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Some of the parts which are not associated with the description may not be provided in order to specifically describe embodiments according to an exemplary embodiment, and like reference numerals refer to like elements throughout the specification.

Figure 2:
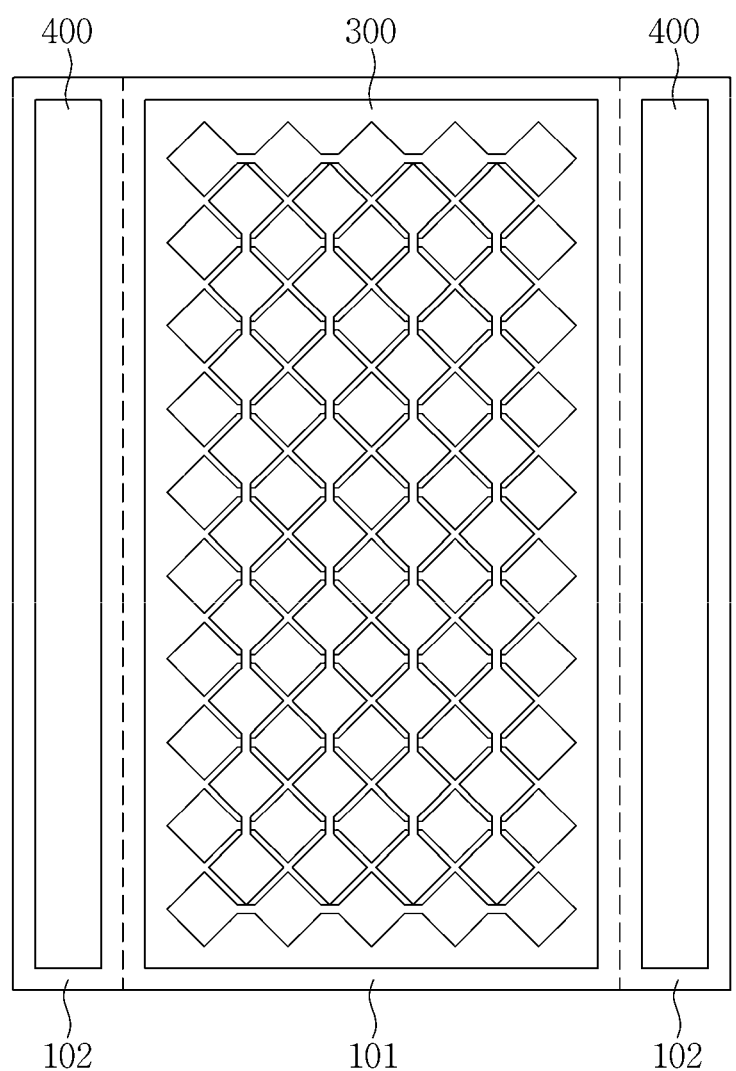
FIG. 2 is a plan view illustrating a bent display device according to an exemplary embodiment.
Figure 3:
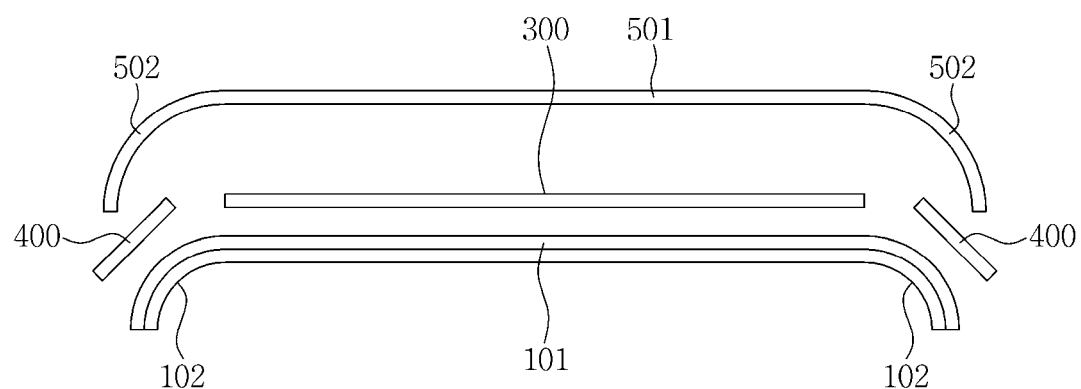
FIG. 3 is a cross-sectional view illustrating a bent display device according to an exemplary embodiment.

FIG. 1 is an exploded perspective view illustrating a bent display device according to an exemplary embodiment, FIG. 2 is a plan view illustrating the bent display device according to an exemplary embodiment, and FIG. 3 is a cross-sectional view illustrating the bent display device according to an exemplary embodiment.

Referring to FIGS. 1, 2, and 3, the bent display device according to an exemplary embodiment includes a display panel 100, a first touch sensor 300, a second touch sensor 400, a window 500, and the like.

The display panel 100 according to an exemplary embodiment may be a flexible display panel. In addition, the display panel 100 according to an exemplary embodiment may be a bent display panel including an edge portion having a bent shape. The display panel 100 may be formed to include an edge portion having a bent shape, or may be formed to have a planar shape and then the edge portion thereof may be bent by being coupled to the window 500, a fixing frame (not illustrated), or the like.

Hereinbelow, for convenience of explanation, a planar portion at a central portion of the display panel 100 will be referred to as a planar surface portion 101, and a bent portion at an edge of the planar surface portion 101 will be referred to as a curved surface portion 102. The display panel 100 according to an exemplary embodiment is depicted as including the curved surface portion 102 formed on opposite edges of the planar surface portion 101, but exemplary embodiments are not limited thereto. In an exemplary embodiment, the curved surface portion 102 may be formed only at one edge of the planar surface portion 101. The planar surface portion 101 and the curved surface portion 102 are described as divided areas for convenience of explanation, but they may be actually one display area.

The display panel 100 may include a plurality of pixels PX for displaying an image. The plurality of pixels PX may be disposed on the planar surface portion 101 and the curved surface portion 102 of the display panel 100 to display an image.

The display panel 100 may include, for example, a flexible film such as a plastic film, and may be implemented by disposing an organic light emitting diode ("OLED") and a pixel circuit on the flexible film. More detailed configurations of the display panel 100 will be described below.

The window 500 may be disposed on the display panel 100. The window 500 according to an exemplary embodiment includes a transparent hard material, thus capable of transmitting a fully intact image of the display panel 100 and protecting the display panel 100 from external impact. In addition, the window 500 may include a flexible film material, such as a plastic film.

The window 500 according to an exemplary embodiment may have substantially the same shape as a shape of the display panel 100. For example, when the display panel 100 includes the planar surface portion 101 and the curved surface portion 102 at the edge of the planar surface portion 101, the window 500 may also include a planar surface portion 501 and a curved surface portion 502 respectively corresponding to the planar surface portion 101 and the curved surface portion 102 of the display panel 100.

The touch sensors 300 and 400 sensing a user's touch action may be disposed between the display panel 100 and the window 500. For example, the first touch sensor 300 is disposed between the planar surface portion 101 of the display panel 100 and the planar surface portion 501 of the window 500, and the second touch sensor 400 may be disposed between the curved surface portion 102 of the display panel 100 and the curved surface portions 502 of the window 500. The first touch sensor 300 may be disposed to overlap the planar surface portion 101 of the display panel 100, and the second touch sensor 400 may be disposed to overlap the curved surface portion 102 of the display panel 100.

The first touch sensor 300 may have substantially the same shape as that of the planar surface portion 101 of the display panel 100 on a plane and the second touch sensor 400 may have substantially the same shape as a shape of the curved surface portion 102 of the display panel 100 on a plane.

The first touch sensor 300 according to an exemplary embodiment is depicted as being disposed between the display panel 100 and the window 500. However, exemplary embodiments are not limited thereto, and the first touch sensor 300 may be implemented directly in the display panel 100.

The first touch sensor 300 and the second touch sensor 400 according to an exemplary embodiment may be driven independently. That is, the first touch sensor 300 and the second touch sensor 400 may be touch sensors which are driven separately in a same driving method, or may be touch sensors which have different driving methods. For example, the first touch sensor 300 may be a capacitive touch sensor, and the second touch sensor 400 may be a pressure sensitive touch sensor, an optical touch sensor, an ultrasonic touch sensor, or the like.

Since the first touch sensor 300 and the second touch sensor 400 according to an exemplary embodiment are driven separately, touch malfunction that may occur at a side portion of the bent display device based on the user's grip state may be substantially prevented. For example, the first touch sensor 300 may include a touch driving unit 350 (see FIG. 9) to be described below, and the second touch sensor 400 may include a control unit (not illustrated) to be described below. The touch driving unit and the control unit may be driven separately. More detailed configurations of the first touch sensor 300 and the second touch sensor 400 will be described below.

Figure 4:
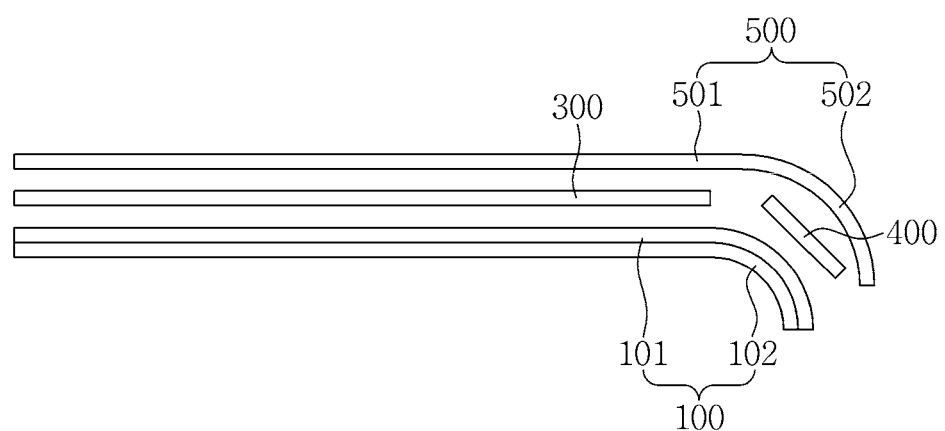
FIGS. 4, 5 and 6 are cross-sectional views illustrating bent display devices according to alternative exemplary embodiments.
Figure 5:
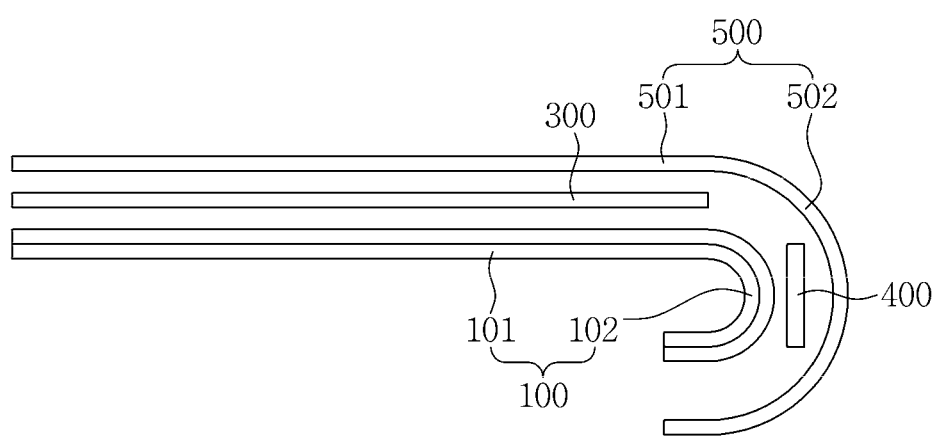
Figure 6:
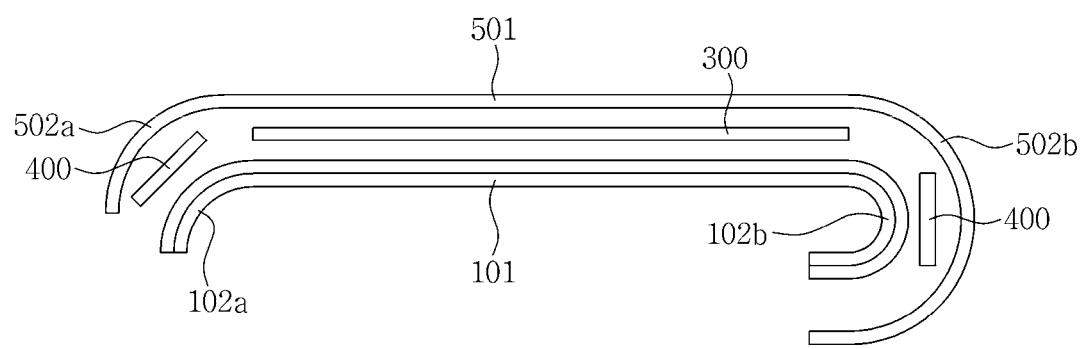

FIGS. 4, 5 and 6 are cross-sectional views illustrating bent display devices according to alternative exemplary embodiments. The description of the bent display device according to an exemplary embodiment will be omitted from the description related to the bent display device according to an alternative exemplary embodiment.

The bent display device according to an alternative exemplary embodiment may include a display panel 100, a first touch sensor 300, a second touch sensor 400, a window 500, and the like.

The display panel 100 may include a planar surface portion 101 and a curved surface portion 102 at an edge of the planar surface portion 101. Referring to FIG. 4, the display panel 100 according to an alternative exemplary embodiment may include the curved surface portion 102 formed only at one edge of the planar surface portion 101. Similarly, the window 500 may include a curved surface portion 502 formed only at one edge of a planar surface portion 501.

In addition, referring to FIG. 5, the display panel 100 according to an alternative exemplary embodiment may include a curved portion 102 bent about 180 degrees to face a rear surface of the display panel 100. Similarly, the window 500 may include a curved surface 502 bent about 180 degrees.

In FIG. 5, the curved surface portion 102 is depicted as being formed only at one edge of the planar surface portion 101, but exemplary embodiments are not limited thereto. The curved surface portion 102 may be formed at opposite edges of the planar surface portion 101.

In addition, referring to FIG. 6, the display panel 100 according to an alternative exemplary embodiment may include curved surface portions 102a and 102b curved in different shapes at opposite edges of the planar surface portion 101. For example, the curved surface portions 102a and 102b at opposite edges of the planar surface portion 101 may be formed to have different degrees of bending. Similarly, the window 500 may include curved surface portions 502a and 502b having different degrees of bending.

Figure 7:
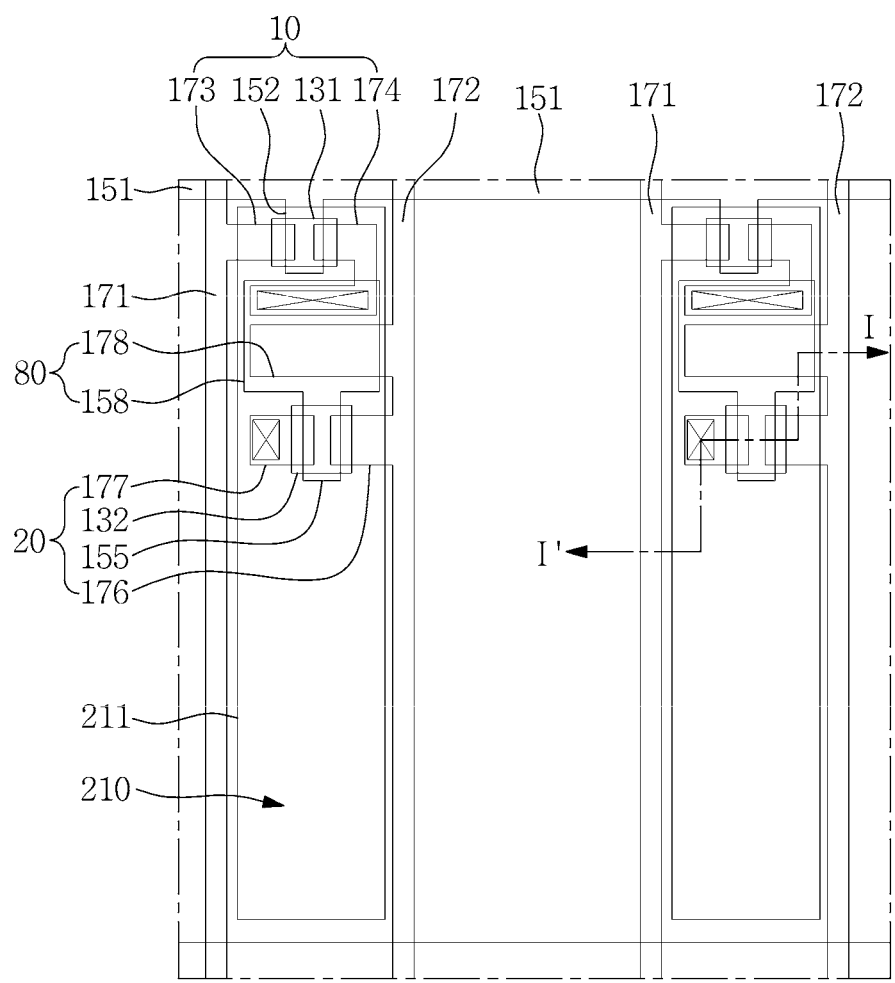
FIG. 7 is an enlarged view illustrating a part of a display panel according to an exemplary embodiment.
Figure 8:
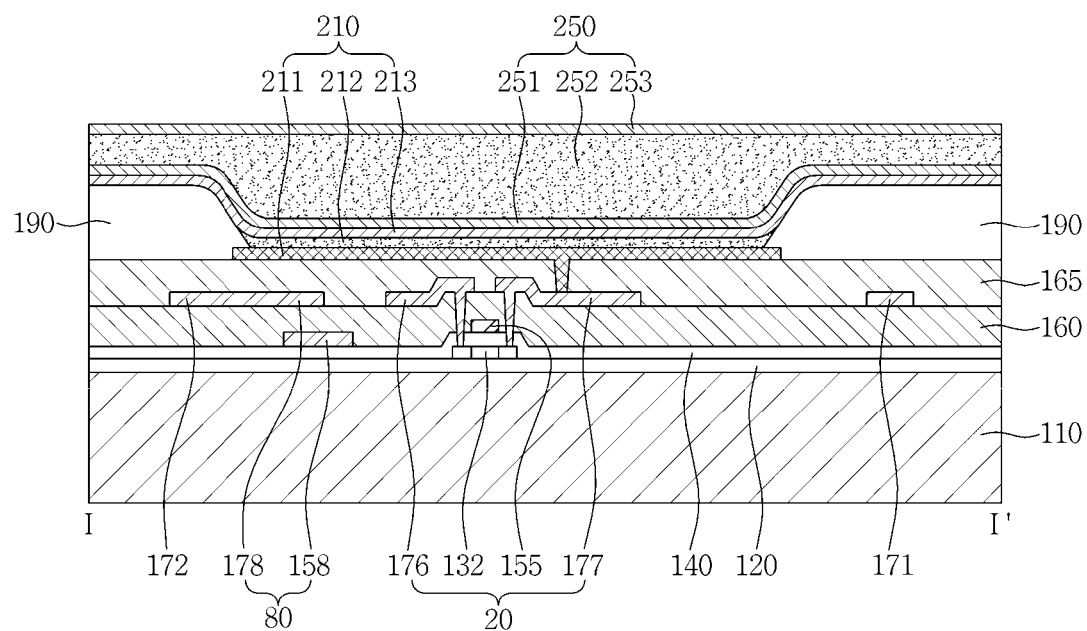
FIG. 8 is a cross-sectional view taken along line I-I' of FIG. 7.

FIG. 7 is an enlarged view illustrating a part of the display panel according to an exemplary embodiment, and FIG. 8 is a cross-sectional view taken along line I-I' of FIG. 7.

Referring to FIGS. 7 and 8, the display panel 100 according to an exemplary embodiment includes a plurality of pixels that include a switching thin film transistor ("TFT") 10, a driving TFT 20, a capacitor 80 and an OLED 210. The OLED 210 may be largely applied to flexible display devices since it may be deposited at a relatively low temperature and has relatively low power consumption, relatively high luminance, and the like. As used herein, the term "pixel" refers to a smallest unit for displaying an image, and the display panel 100 displays an image using a plurality of pixels.

In addition, although each pixel is depicted in the drawings as including two TFTs and one capacitor, exemplary embodiments are not limited thereto. Each pixel may include three or more TFTs and two or more capacitors, and may further include additional wirings to have various structures.

The display panel 100 includes a substrate 110, a gate line 151 on the substrate 110, a data line 171, and a common power line 172 insulated from and intersecting the gate line 151. In general, each pixel may be defined by the gate line 151, the data line 171, and the common power line 172 as a boundary, but the pixel is not limited to the above-described definition. The pixels may be defined by a pixel defining layer or a black matrix.

The substrate 110 may include a flexible material. An example of the flexible material may include a plastic material. For example, the substrate 110 may include one selected from the group consisting of: kapton, polyethersulphone (PES), polycarbonate (PC), polyimide (PI), polyethyleneterephthalate (PET), polyethylene naphthalate (PEN), polyacrylate (PAR), fiber reinforced plastic (FRP), and the like.

In addition, the substrate 110 may have a thickness ranging from about 5 μm to about 200 μm. In the case where the substrate 110 has a thickness of less than about 5 μm, it is difficult for the substrate 110 to stably support the OLED 210. On the other hand, in the case where the substrate 110 has a thickness of about 200 μm or more, the flexible characteristics of the substrate 110 may be degraded.

A buffer layer 120 is disposed on the substrate 110. The buffer layer 120 is configured to prevent permeation of undesirable elements and to planarize a surface therebelow, and may include suitable materials for preventing permeation and/or planarizing. For example, the buffer layer 120 may include one of the followings: a silicon nitride ($SiN_x$) layer, a silicon oxide ($SiO_2$) layer, and a silicon oxynitride ($SiO_xN_y$) layer. However, the buffer layer 120 is not required, and may be omitted based on the kinds of the substrate 110 and process conditions thereof.

A switching semiconductor layer 131 and a driving semiconductor layer 132 are disposed on the buffer layer 120. The switching semiconductor layer 131 and the driving semiconductor layer 132 may include at least one of the followings: a polycrystalline silicon layer, an amorphous silicon layer, and an oxide semiconductor including, for example, indium gallium zinc oxide (IGZO) and indium zinc tin oxide (IZTO). For example, in the case where the driving semiconductor layer 132 includes a polycrystalline silicon layer, the driving semiconductor layer 132 includes a channel area that is not doped with impurities and p+ doped source and drain areas that are formed on opposite sides of the channel area. In such an exemplary embodiment, p-type impurities, such as boron B, may be used as dopant ions, and $B_2H_6$ is typically used. Such impurities may vary depending on the kinds of TFTs. The driving TFT 20 according to an exemplary embodiment uses a p-channel metal oxide semiconductor (PMOS) TFT including p-type impurities, but exemplary embodiments are not limited thereto. Alternatively, the driving TFT 20 may use an n-channel metal oxide semiconductor (NMOS) TFT or a complementary metal oxide semiconductor (CMOS) TFT.

A gate insulating layer 140 is disposed on the switching semiconductor layer 131 and the driving semiconductor layer 132. The gate insulating layer 140 may include at least one of: tetraethylorthosilicate (TEOS), silicon nitride ($SiN_x$), and silicon oxide ($SiO_2$). For example, the gate insulating layer 140 may have a double-layer structure where a $SiN_x$ layer having a thickness of about 40 nm and a TEOS layer having a thickness of about 80 nm are sequentially stacked.

A gate wiring including gate electrodes 152 and 155 is disposed on the gate insulating layer 140. The gate wiring further includes the gate line 151, a first capacitor plate 158, and other lines. In addition, the gate electrodes 152 and 155 are disposed to overlap at least a portion of the semiconductor layers 131 and 132, for example, a channel area thereof. The gate electrodes 152 and 155 serve to substantially prevent the channel area from being doped with impurities when source and drain areas of the semiconductor layers 131 and 132 are doped with impurities during the process of forming the semiconductor layers 131 and 132.

The gate electrodes 152 and 155 and the first capacitor plate 158 are disposed on a substantially same layer and include a substantially same metal material. The gate electrodes 152 and 155 and the first capacitor plate 158 may include at least one of molybdenum (Mo), chromium (Cr), and tungsten (W).

An insulating interlayer 160 overlapping the gate electrodes 152 and 155 is disposed on the gate insulating layer 140. The insulating interlayer 160, similar to the gate insulating layer 140, may include or be formed of silicon nitride ($SiN_x$), silicon oxide ($SiO_x$), tetraethoxysilane (TEOS) or the like, but exemplary embodiments are not limited thereto.

A data wiring including source electrodes 173 and 176 and drain electrodes 174 and 177 is disposed on the insulating interlayer 160. The data wiring further includes the data line 171, the common power line 172, a second capacitor plate 178, and other lines. In addition, the source electrodes 173 and 176 and the drain electrodes 174 and 177 are connected to a source area and a drain area of the semiconductor layers 131 and 132, respectively, through a contact hole defined in the gate insulating layer 140 and the insulating interlayer 160.

As such, the switching TFT 10 includes the switching semiconductor layer 131, the switching gate electrode 152, the switching source electrode 173, and the switching drain electrode 174, and the driving TFT 20 includes the driving semiconductor layer 132, the driving gate electrode 155, the driving source electrode 176, and the driving drain electrode 177. Configurations of the TFTs 10 and 20 are not limited to the above exemplary embodiments, and thus may be modified into various structures that are known to and may be easily conceived by those skilled in the pertinent art.

In addition, the capacitor 80 includes the first capacitor plate 158 and the second capacitor plate 178, having the insulating interlayer 160 interposed therebetween.

The switching TFT 10 may function as a switching element configured to select pixels to perform light emission. The switching gate electrode 152 is connected to the gate line 151. The switching source electrode 173 is connected to the data line 171. The switching drain electrode 174 is spaced apart from the switching source electrode 173 and is connected to the first capacitor plate 158.

The driving TFT 20 applies a driving power to a pixel electrode 211, which allows a light emitting layer 212 of the OLED 210 in the selected pixel to emit light. The driving gate electrode 155 is connected to the first capacitor plate 158. The driving source electrode 176 and the second capacitor plate 178 each are connected to the common power line 172. The driving drain electrode 177 is connected to the pixel electrode 211 of the OLED 210 through a contact hole.

With the aforementioned structure, the switching TFT 10 is driven by a gate voltage applied to the gate line 151 and serves to transmit a data voltage applied to the data line 171 to the driving TFT 20. A voltage equivalent to a difference between a common voltage applied to the driving TFT 20 from the common power line 172 and the data voltage transmitted from the switching TFT 10 is stored in the capacitor 80, and a current corresponding to the voltage stored in the capacitor 80 flows to the OLED 210 through the driving TFT 20, such that the OLED 210 may emit light.

A planarization layer 165 is disposed to cover the data wiring, e.g., the data line 171, the common power line 172, the source electrodes 173 and 176, the drain electrodes 174 and 177, and the second capacitor plate 178, which are patterned into a substantially same layer on the insulating interlayer 160.

The planarization layer 165 serves to substantially eliminate a step difference and planarize a surface so as to increase luminance efficiency of the OLED 210 to be formed thereon. The planarization layer 165 may include at least one of the following materials: a polyacrylate resin, an epoxy resin, a phenolic resin, a polyamide resin, a polyimide resin, an unsaturated polyester resin, a polyphenylen ether resin, a polyphenylene sulfide resin, and benzocyclobutene (BCB).

The pixel electrode 211 of the OLED 210 is disposed on the planarization layer 165. The pixel electrode 211 is connected to the drain electrode 177 through a contact hole defined in the planarization layer 165.

A pixel defining layer 190 is disposed on the planarization layer 165 and exposes at least a portion of the pixel electrode 211 to define a pixel area. The pixel electrode 211 is disposed corresponding to the pixel area of the pixel defining layer 190. The pixel defining layer 190 may include a resin, such as a polyacrylate resin and a polyimide resin.

In the pixel area, the light emitting layer 212 is disposed on the pixel electrode 211 and a common electrode 213 is disposed on the pixel defining layer 190 and the light emitting layer 212. The light emitting layer 212 includes a low molecular organic material or a high molecular organic material. At least one of a hole injection layer and a hole transporting layer may further be disposed between the pixel electrode 211 and the light emitting layer 212, and at least one of an electron transporting layer and an electron injection layer may further be disposed between the light emitting layer 212 and the common electrode 213.

The pixel electrode 211 and the common electrode 213 may be formed as a transmissive electrode, a transflective electrode, or a reflective electrode.

Transparent conductive oxide ("TCO") may be used to form a transmissive electrode. Such a TCO may include at least one selected from the group consisting of: indium tin oxide (ITO), indium zinc oxide (IZO), zinc oxide (ZnO), or indium oxide ($In_2O_3$)

A metal, e.g., magnesium (Mg), silver (Ag), gold (Au), calcium (Ca), lithium (Li), chromium (Cr), aluminum (Al), and copper (Cu), or an alloy thereof may be used to form a transflective electrode and a reflective electrode. In such an exemplary embodiment, whether an electrode is a transflective type or a reflective type depends on the thickness of the electrode. Typically, the transflective electrode has a thickness of about 200 nm or less and the reflective electrode has a thickness of about 300 nm or more. As the thickness of the transflective electrode decreases, light transmittance and resistance increase. On the contrary, as the thickness of the transflective electrode increases, light transmittance decreases.

In addition, the transflective electrode and the reflective electrode may have a multilayer structure which includes a metal layer including a metal or a metal alloy, and a TCO layer stacked on the metal layer.

A thin film encapsulation layer 250 is disposed on the common electrode 213. The thin film encapsulation layer 250 includes one or more inorganic layers 251 and 253 and one or more organic layers 252. Further, the thin film encapsulation layer 250 may have a structure in which one or more inorganic layers 251 and 253 and one or more organic layers 252 are alternately stacked. In such an exemplary embodiment, an inorganic layer 251 is disposed at a lowermost portion. That is, the inorganic layer 251 is disposed to be most closely adjacent to the OLED 210.

The thin film encapsulation layer 250 is depicted as including two inorganic layers 251 and 253 and one organic layer 252, but exemplary embodiments are not limited thereto.

The inorganic layers 251 and 253 may include one or more inorganic materials selected from the group consisting of: $Al_2O_3$, $TiO_2$, ZrO, $SiN_x$, $SiO_2$, AlON, AlN, SiON, $Si_3N_4$, ZnO, and $Ta_2O_5$. The inorganic layers 251 and 253 may be formed through methods such as a chemical vapor deposition (CVD) method or an atomic layer deposition (ALD) method. However, exemplary embodiments are not limited thereto, and the inorganic layers 251 and 253 may be formed using various methods known to those skilled in the art.

The organic layer 252 may include a polymer-based material. Examples of the polymer-based material may include, for example, an acrylic resin, an epoxy resin, polyimide, and polyethylene. In addition, the organic layer 252 may be formed through a thermal deposition process. In addition, the thermal deposition process for forming the organic layer 252 may be performed at a temperature range that may not damage the OLED 210. However, exemplary embodiments are not limited thereto, and the organic layer 252 may be formed using various methods known to those skilled in the pertinent art.

The inorganic layers 251 and 253 which have a high density of thin film may prevent or efficiently reduce permeation of, mostly, moisture or oxygen. Permeation of moisture and oxygen into the OLED 210 may be largely prevented by the inorganic layers 251 and 253.

The thin film encapsulation layer 250 may have a thickness of about 10 μm or less. Accordingly, the OLED display panel 100 may also have a significantly reduced thickness. By applying the thin film encapsulation layer 250 in such a manner, the OLED display panel 100 may have flexible characteristics.

Figure 9:
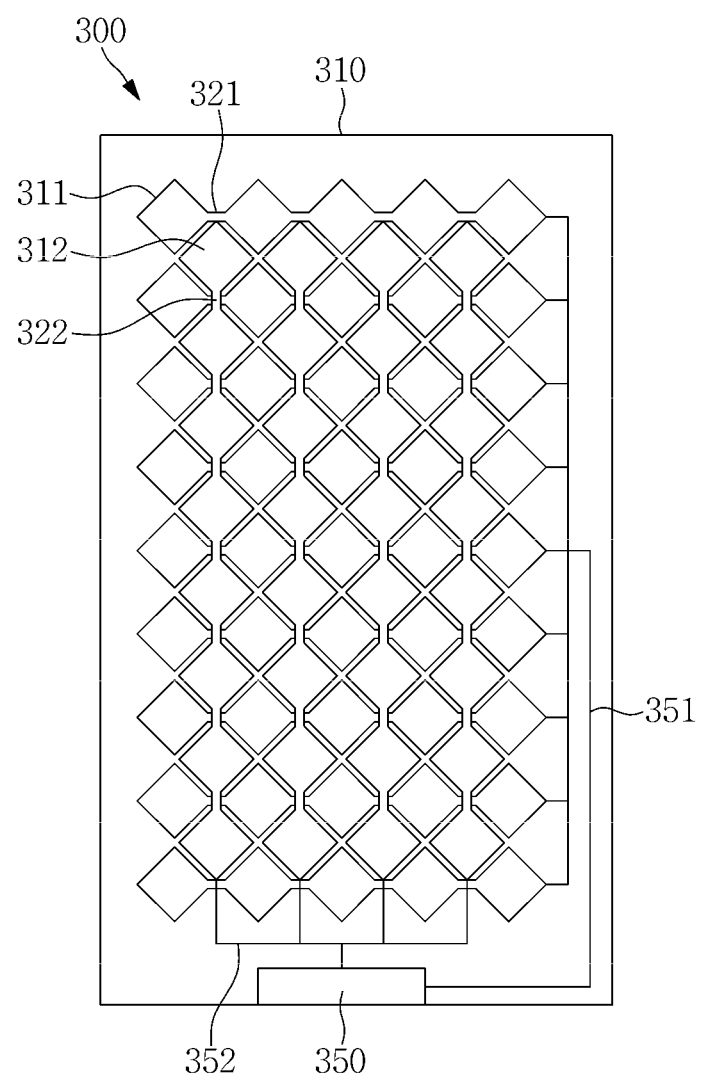
FIG. 9 is a plan view illustrating a first touch sensor according to an exemplary embodiment.

FIG. 9 is a plan view illustrating the first touch sensor 300 according to an exemplary embodiment. The first touch sensor 300 according to an exemplary embodiment may be a capacitive touch sensor.

Referring to FIG. 9, the first touch sensor 300 according to an exemplary embodiment includes a touch substrate 310, a plurality of first sensing electrodes 311 and a plurality of second sensing electrodes 312 on the touch substrate 310, a first connection wiring 321 connecting the first sensing electrodes 311, a second connection wiring 322 connecting the second sensing electrodes 312, a touch driving unit 350, and the like. The first sensing electrodes 311 may be connected to the touch driving unit 350 through a first routing wiring 351 and the second sensing electrodes 312 may be connected to the touch driving unit 350 through a second routing wiring 352.

The plurality of first sensing electrodes 311 and the plurality of second sensing electrodes 312 are depicted as being formed on the touch substrate 310 to be disposed on the display panel 100, thus forming the first touch sensor 300, but exemplary embodiments are not limited thereto. In an exemplary embodiment, the touch substrate 310 may be omitted and the plurality of first sensing electrodes 311, the plurality of second sensing electrodes 312, and the like may be directly formed on the display panel 100.

The first sensing electrode 311 and the second sensing electrode 312 may be disposed so as not to overlap each other on a plane. The first sensing electrode 311 and the second sensing electrode 312 are depicted as having the shape of a rhombic surface electrode, but exemplary embodiments are not limited thereto. The first sensing electrode 311 and the second sensing electrode 312 may have a triangular shape, a quadrangular shape, or a mesh electrode shape.

The first sensing electrode 311 and the second sensing electrode 312 may have a suitable size to detect a touch according to the size and purpose of the display panel 100. For example, an area of the first sensing electrode 311 and an area the second sensing electrode 312 may be in a range of about several square millimeters (mm$^2$) to about tens of several square millimeters.

The first sensing electrode 311 and the second sensing electrode 312 may be formed on substantially the same layer, or may be insulated from each other by an insulating layer or the like. The first connection wiring 321 and the second connection wiring 322 may be insulated from and intersect each other on a plane.

The first sensing electrode 311, the second sensing electrode 312, the first connection wiring 321, and the second connection wiring 322 may include a metal or a TCO. Such a TCO may include at least one selected from the group consisting of: indium tin oxide (ITO), indium zinc oxide (IZO), zinc oxide (ZnO), carbon nanotube (CNT), and graphene.

The touch driving unit 350 inputs a driving signal to the first sensing electrode 311 and may determine the presence or absence of the touch and identify touch coordinates using a capacitance variation or a voltage variation measured by the second sensing electrode 312.

Figure 10:
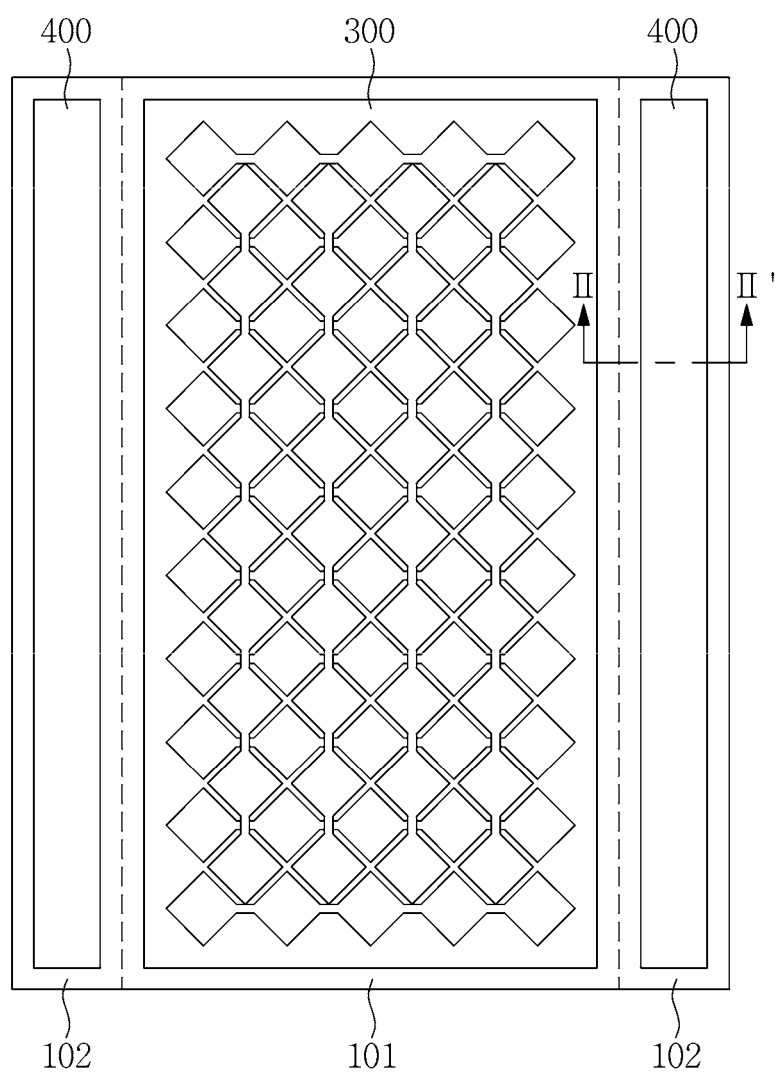
FIG. 10 is a plan view illustrating a first touch sensor and a second touch sensor according to an exemplary embodiment.
Figure 11:
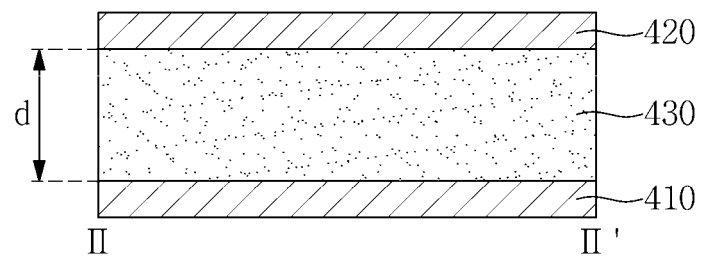
FIG. 11 is a cross-sectional view taken along line II-II' of FIG. 10.

FIG. 10 is a plan view illustrating the first touch sensor 300 and the second touch sensor 400 according to an exemplary embodiment, and FIG. 11 is a cross-sectional view taken along line II-II' of FIG. 10.

Referring to FIGS. 10 and 11, the second touch sensor 400 according to an exemplary embodiment may be disposed on the curved surface portion 102 of the display panel 100. The second touch sensor 400 may have substantially the same shape as a shape of the curved surface portion 102 on a plane. As illustrated in FIG. 10, in the case where the curved surface portion 102 has a stripe shape on a plane, the second touch sensor 400 may also have a stripe shape on a plane. In addition, in the case where the curved surface portion 102 has a rim shape on a plane along an edge of the planar surface portion 101, the second touch sensor 400 may also have a rim shape on a plane.

The second touch sensor 400 may include a first electrode 410 and a second electrode 420 opposing each other, a filler 430 between the first electrode 410 and the second electrode 420, a control unit (not illustrated), and the like.

The first electrode 410 and the second electrode 420 may include a metal or a TCO. Such a TCO may include at least one selected from the group consisting of: ITO, IZO, ZnO, CNT and graphene.

The filler 430 may include a transparent and resilient material. For example, the filler 430 may include at least one of silicon and polydimethylsiloxane (PDMS).

The control unit (not illustrated) may apply a voltage between the first electrode 410 and the second electrode 420 to sense a capacitance change between the first electrode 410 and the second electrode 420. The capacitance between the first electrode 410 and the second electrode 420 is inversely proportional to a distance d between the first electrode 410 and the second electrode 420 or a thickness d of the filler 430. That is, when the thickness of the filler 430 changes according to the touch pressure due to external touch, the capacitance between the first electrode 410 and the second electrode 420 changes, and the change of the capacitance is sensed to determine whether or not a touch occurred.

Since the second touch sensor 400 operates separately from the first touch sensor 300, the likelihood of a touch malfunction that may occur at the side portion of the bent display device based on the user's grip state may be substantially reduced.

Figure 12:
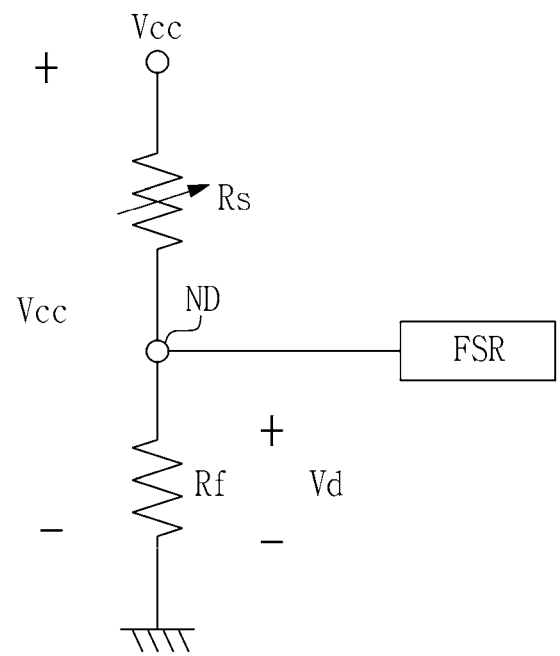
FIG. 12 is a circuit diagram illustrating a configuration of a second touch sensor according to an alternative exemplary embodiment.

FIG. 12 is a circuit diagram illustrating a configuration of a second touch sensor according to an alternative exemplary embodiment.

Referring to FIG. 12, the second touch sensor 400 according to an alternative exemplary embodiment may include a sensor resistor Rs of which a resistance value varies in accordance with a pressure applied by contact, a filter resistor Rf connected in series to the sensor resistor Rs and having a constant resistance value, and a pressure sensing unit FSR connected to a node ND between the sensor resistor Rs and the filter resistor Rf.

The sensor resistance Rs includes a piezoresistive material, and a resistance value thereof may change when pressure is applied. Examples of such pressure resistance materials may include carbon nanotube (CNT) and graphene. The filter resistor Rf is connected in series to the sensor resistor Rs and may have a constant resistance value.

A reference voltage Vcc may be applied to the sensor resistor Rs and the filter resistor Rf that are connected in series. The pressure sensing unit FSR is connected to the node ND between the sensor resistor Rs and the filter resistor Rf to sense a divided voltage Vd that is divided by the sensor resistor Rs and the filter resistor Rf. Accordingly, when a value of the divided voltage Vd is changed due to an external touch, it can be sensed and whether or not the touch occurred may be identified.

Since such a second touch sensor 400 operates separately from the first touch sensor 300, the likelihood of a touch malfunction that may occur at the side portion of the bent display device based on the user's grip state may be substantially reduced.

Figure 13:
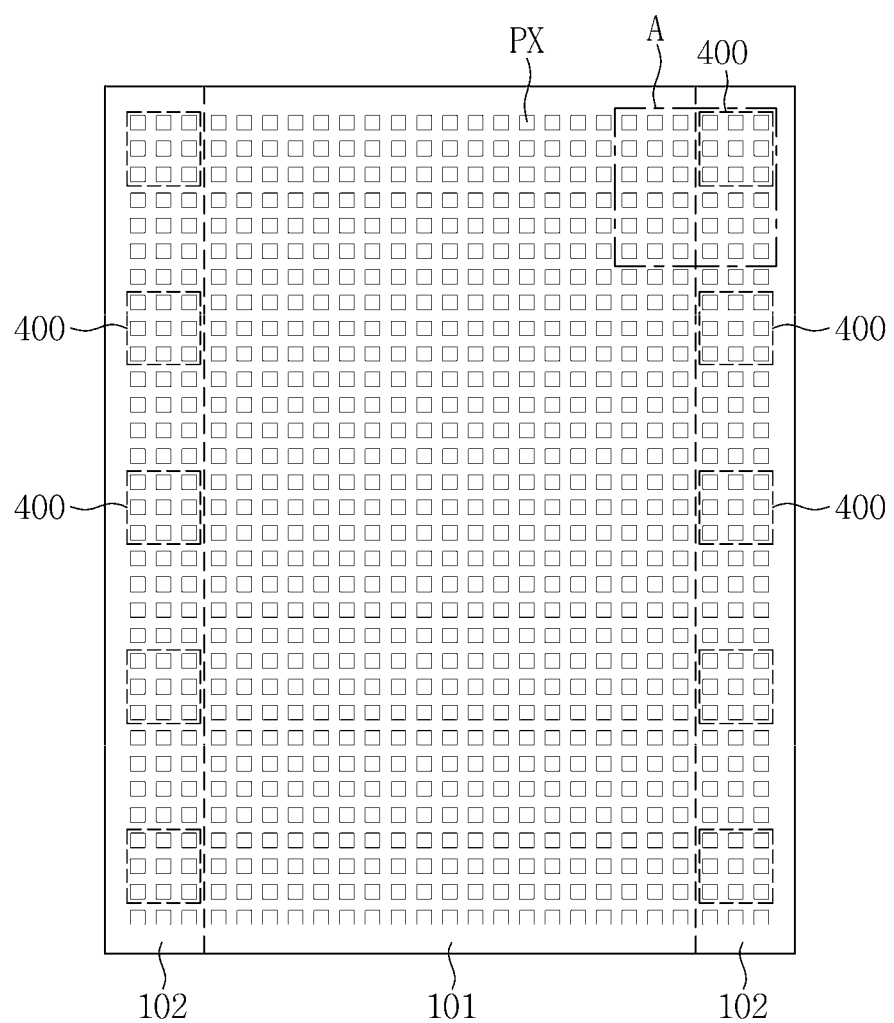
FIG. 13 is a plan view illustrating a bent display device according to an alternative exemplary embodiment.
Figure 14:
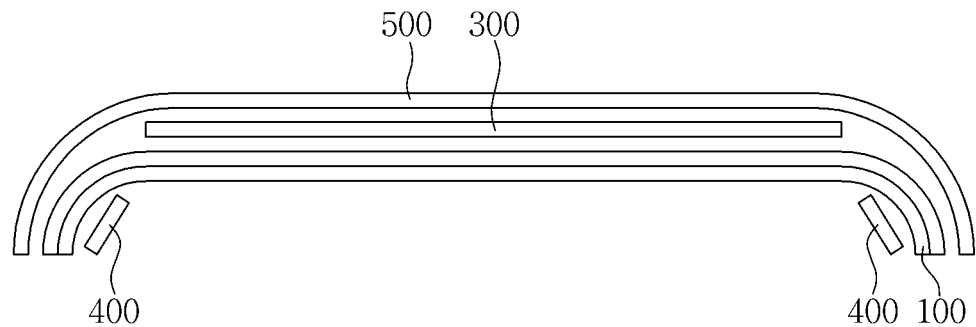
FIG. 14 is a cross-sectional view illustrating the bent display device according to an alternative exemplary embodiment.
Figure 15:
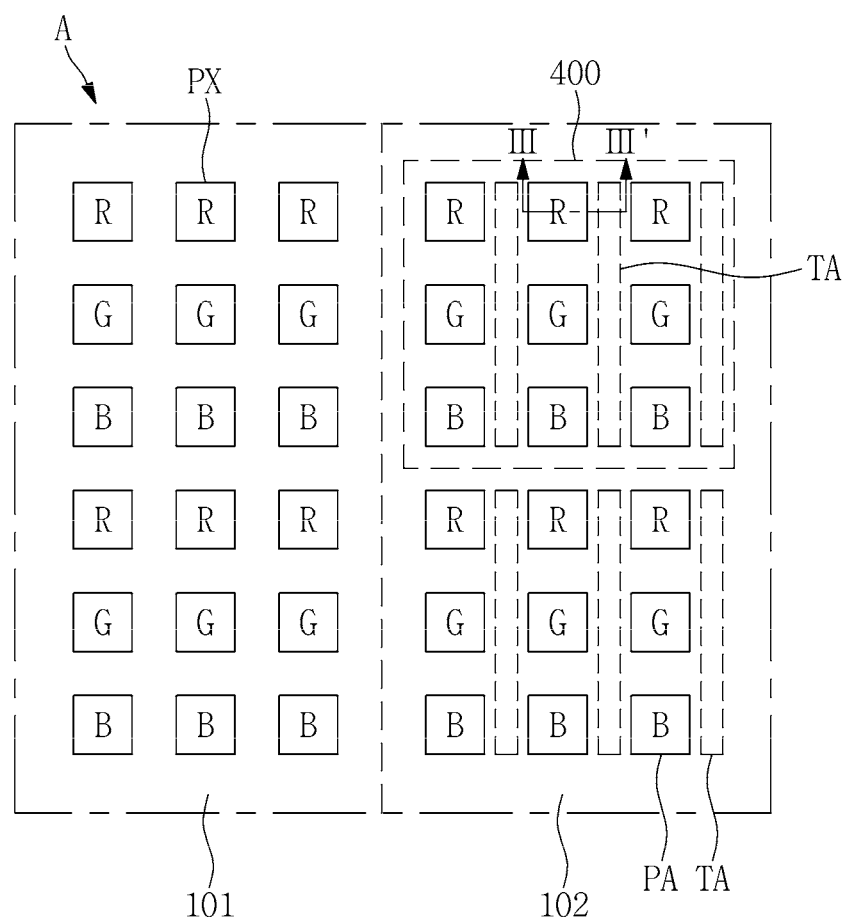
FIG. 15 is an enlarged view illustrating an area "A" of FIG. 13.
Figure 16:
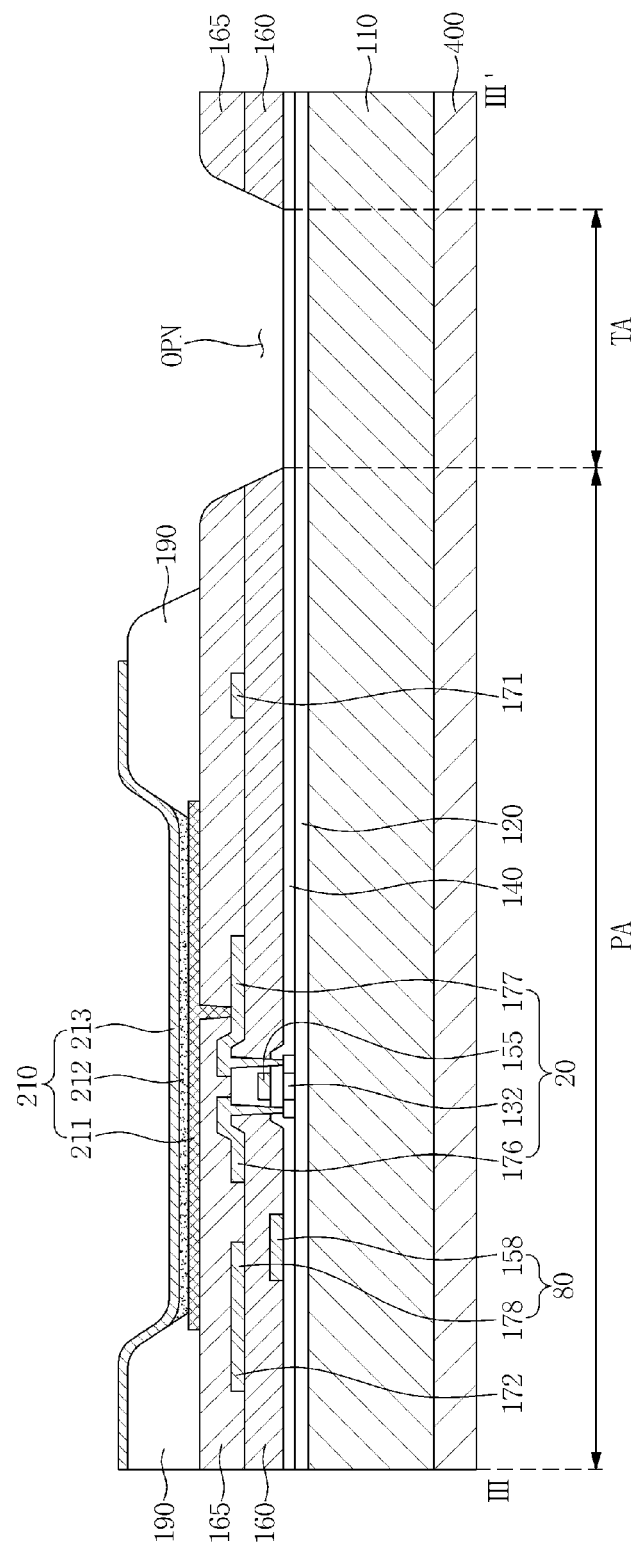
FIG. 16 is a cross-sectional view taken along line of FIG. 15.

FIG. 13 is a plan view illustrating a bent display device according to an alternative exemplary embodiment, FIG. 14 is a cross-sectional view illustrating the bent display device according to an alternative exemplary embodiment, and FIG. 15 is an enlarged view illustrating an area "A" of FIG. 13.

The description of the bent display device according to an exemplary embodiment will be omitted from the description related to the bent display device according to an alternative exemplary embodiment.

Referring to FIGS. 13, 14, 15, and 16, the bent display device according to an alternative exemplary embodiment may include a display panel 100, a first touch sensor 300, a second touch sensor 400, a window 500, and the like.

The display panel 100 may include a planar surface portion 101 and a curved surface portion 102 at an edge of the planar surface portion 101. The second touch sensor 400 according to an alternative exemplary may include a plurality of second touch sensors 400 disposed on a rear surface of the curved surface portion 102 of the display panel 100.

However, exemplary embodiments are not limited thereto, and the second touch sensor 400 may be implemented directly in the display panel 100. For example, the second touch sensor 400 may be disposed among a plurality of pixels PX disposed at the curved surface portion 102 of the display panel 100.

The second touch sensor 400 according to an alternative exemplary embodiment may be an optical touch sensor or an ultrasonic touch sensor.

The display panel 100 may include a plurality of pixels PX for displaying an image. The plurality of pixels PX may be disposed at the planar surface portion 101 and the curved surface portion 102 of the display panel 100 to display an image.

The curved surface portion 102 of the display panel 100 may include a pixel area PA where a pixel PX or the like is disposed and an image is displayed and a transmissive area TA through which light is transmitted.

Three pixel areas PA and one transmissive area TA are depicted as being arranged in one direction in the drawings, but exemplary embodiments are not limited thereto. The pixel area PA and the transmissive area TA may be arranged in various shapes and numbers. In addition, although the transmissive area TA is depicted as having a quadrangular shape, but exemplary embodiments are not limited thereto, and the transmissive area TA may be provided in various other shapes, such as a polygonal shape and a circular shape.

The transmissive area TA may have an opening OPN so that light or ultrasonic wave propagating through the transmissive area TA may pass therethrough. The openings OPN may be defined in such a manner that at least a part of an insulating layer and elements for light emission are removed. For example, the opening OPN may be defined by removing an insulating interlayer 160, a planarization layer 165, and the like. However, exemplary embodiments are not limited thereto, and a buffer layer 120 and a gate insulating layer 140 may also be removed.

A light emitted from an OLED 210 at the pixel area PA of the curved surface portion 102 is reflected by a user's finger or the like, and the reflected light may reach the second touch sensor 400 through the opening OPN of the transmissive area TA.

In an alternative exemplary embodiment, the curved surface portion 102 of the display panel 100 may further include an ultrasonic wave generator (not illustrated). Ultrasonic wave generated from the ultrasonic wave generator (not illustrated) is reflected by a user's finger or the like, and the reflected ultrasonic wave may reach the second touch sensor 400 through the opening OPN of the transmissive area TA.

The second touch sensor 400 may determine whether a touch occurred or not, using the sensed light or ultrasonic wave. In addition, the second touch sensor 400 may sense fingerprints using sensed light or ultrasonic wave.

Figure 17:
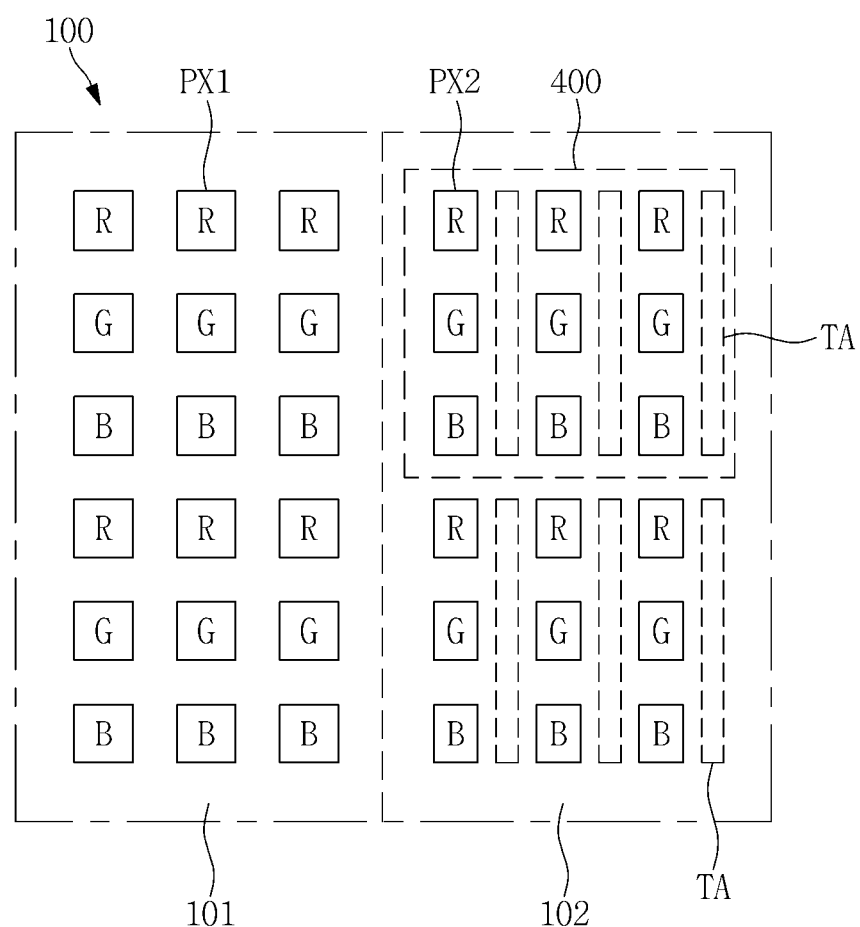
FIG. 17 is a plan view schematically illustrating a part of a display panel according to an alternative exemplary embodiment.

FIG. 17 is a plan view schematically illustrating a part of a display panel according to an alternative exemplary embodiment. The description of the bent display device according to an exemplary embodiment will be omitted from the description related to the bent display device according to an alternative exemplary embodiment.

Referring to FIG. 17, the display panel 100 according to an alternative exemplary embodiment may include a planar surface portion 101 and a curved surface portion 102 at an edge of the planar surface portion 101.

The display panel 100 may include a plurality of pixels PX1 and PX2 for displaying an image. The plurality of pixels PX1 and PX2 may be disposed at the planar surface portion 101 and the curved surface portion 102 of the display panel 100 to display an image. Hereinafter, for convenience of explanation, a pixel disposed at the planar surface portion 101 is referred to as a first pixel PX1, and a pixel disposed at the curved surface portion 102 is referred to as a second pixel PX2. The curved surface portion 102 of the display panel 100 may further include a transmissive area TA through which light is transmitted.

Since the display panel 100 according to an alternative exemplary embodiment additionally includes the transmissive area TA defined at the curved surface portion 102, a resolution of the curved surface portion 102 may be less than a resolution of the planar surface portion 101.

In addition, the second pixel PX2 may be formed to be smaller than the first pixel PX1 to increase an area of the transmissive area TA.

As such, the display panel 100 according to an alternative exemplary embodiment may be configured so that an amount of transmitted light or ultrasonic wave is increased by forming the transmissive area TA at the curved surface portion 102, and accordingly, the sensitivity of the second touch sensor (not illustrated) may be improved.

Figure 18:
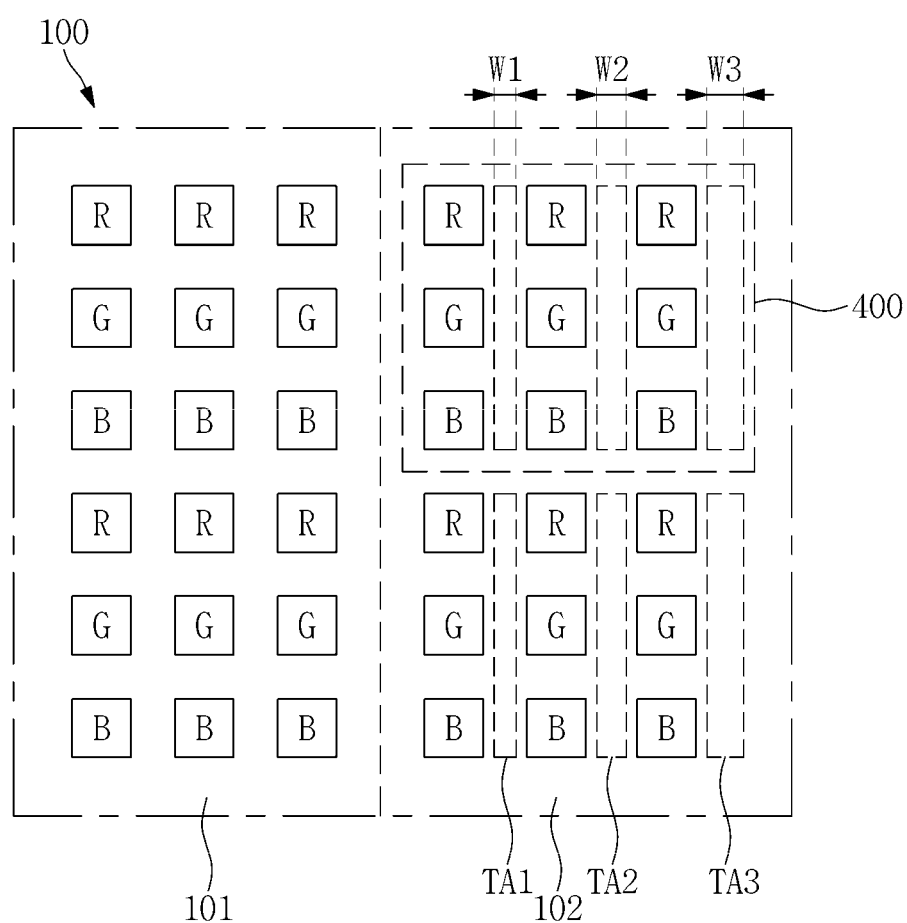
FIG. 18 is a plan view schematically illustrating a part of a display panel according to another alternative exemplary embodiment.

FIG. 18 is a plan view schematically illustrating a part of a display panel according to another alternative exemplary embodiment. The description of the bent display device according to an alternative exemplary embodiment will be omitted from the description related to the bent display device according to an exemplary embodiment.

Referring to FIG. 18, the display panel 100 according to another alternative exemplary embodiment may include a planar surface portion 101 and a curved surface portion 102 at an edge of the planar surface portion 101.

The display panel 100 may include a plurality of pixels PX for displaying an image. The plurality of pixels PX may be disposed at the planar surface portion 101 and the curved surface portion 102 of the display panel 100 to display an image. The curved surface portion 102 of the display panel 100 may further include a transmissive area TA through which light is transmitted.

An area of the transmissive area TA according to another alternative exemplary embodiment may gradually increase from a boundary between the planar surface portion 101 and the curved surface portion 102 toward an edge of the display panel 100.

For example, let TA1, TA2 and TA3 denote transmissive areas TA adjacent to the boundary between the planar surface portion 101 and the curved surface portion 102 in order, W1 denote a width of the transmissive area TA1, W2 denote a width of the transmissive area TA2, and W3 denote a width of the transmissive area TA3, and in such an example, the width W1, the width W2 and the width W3 may satisfy the following Mathematical Formula 1.

$$W1<W2<W3 \quad \text{[Mathematical Formula 1]}$$

As such, the display panel 100 according to another alternative exemplary embodiment is configured so that the transmissive areas TA at the curved surface portion 102 increases toward the edge so as to increase an amount of transmitted light or ultrasonic wave, and accordingly, the sensitivity of the second touch sensor (not illustrated) may be improved.

As set forth hereinabove, according to one or more exemplary embodiments, the bendable display device may distinguish between a touch sensor at the planar surface portion and a touch sensor at the curved surface portion to detect a touch in different manners, such that touch malfunctions occurring at a side surface of the bent display device may be substantially prevented.

The bent display device according to one or more exemplary embodiments includes a pressure sensitive touch sensor, an optical touch sensor, and an ultrasonic touch sensor on the curved surface portion to detect a touch in a separate manner from a touch sensor on the planar surface portion, such that the likelihood of touch malfunctions occurring at the side surface portion of the bent display device may be substantially reduced.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A bent display device comprising:
a display panel comprising a planar surface portion and a curved surface portion disposed at an edge of the planar surface portion;
a window disposed on the display panel and having a substantially same shape as a shape of the display panel;
a first touch sensor disposed to overlap the planar surface portion; and
a second touch sensor disposed to overlap the curved surface portion,
wherein:
the first touch sensor and the second touch sensor are configured to detect a touch using different methods, respectively;
the second touch sensor comprises an optical touch sensor;
the first touch sensor is disposed on a first surface of the display panel; and
the second touch sensor is disposed on a second surface of the display panel, the second surface being opposite to the first surface.

2. The bent display device as claimed in claim 1, wherein the first touch sensor is a capacitive touch sensor.

3. The bent display device as claimed in claim 1, wherein the first touch sensor has a substantially same shape as a shape of the planar surface portion on a plane.

4. The bent display device as claimed in claim 1, wherein the second touch sensor has a substantially same shape as a shape of the curved surface portion on a plane.

5. The bent display device as claimed in claim 1, wherein the first touch sensor and the second touch sensor comprise different driving units, respectively.

6. The bent display device as claimed in claim 1, wherein the display panel is an organic light emitting diode display panel.

7. The bent display device as claimed in claim 1, wherein the first touch sensor is disposed between the display panel and the window.

8. The bent display device as claimed in claim 1, wherein the first touch sensor is disposed inside the display panel.

9. The bent display device as claimed in claim 1, wherein the second touch sensor is disposed between the display panel and the window.

10. The bent display device as claimed in claim 1, wherein the second surface is disposed on a rear surface of the display panel.

11. The bent display device as claimed in claim 10, wherein the curved surface portion comprises:
a pixel area at which an image is displayed; and
a transmissive area, disposed between the pixel areas, through which a light is transmitted.

12. A bent display device comprising:
a display panel comprising a planar surface portion and a curved surface portion disposed at an edge of the planar surface portion;
a window disposed on the display panel and having a substantially same shape as a shape of the display panel;
a first touch sensor disposed to overlap the planar surface portion; and
a second touch sensor disposed on a rear surface of the display panel to overlap the curved surface portion,
wherein:
the first touch sensor and the second touch sensor are configured to detect a touch using different methods, respectively;
the curved surface portion comprises:
a pixel area at which an image is displayed; and
a transmissive area, disposed between the pixel areas, through which a light is transmitted; and the transmissive area gradually increases from a boundary between the planar surface portion and the curved surface portion toward an edge of the display panel.

13. A bent display device comprising:
a display panel comprising a planar surface portion and a curved surface portion disposed at an edge of the planar surface portion;
a window disposed on the display panel and having a substantially same shape as a shape of the display panel;
a first touch sensor disposed to overlap the planar surface portion; and
a second touch sensor disposed on a rear surface of the display panel to overlap the curved surface portion,
wherein:
the first touch sensor and the second touch sensor are configured to detect a touch using different methods, respectively;
the display panel comprises:
   a first pixel disposed at the planar surface portion and configured to display an image; and
   a second pixel disposed at the curved surface portion and configured to display an image; and
an area of the first pixel is larger than an area of the second pixel.

\* \* \* \* \*